United States Patent
Kern et al.

(10) Patent No.: US 7,342,650 B2
(45) Date of Patent: Mar. 11, 2008

(54) ELECTRONIC DISPLAY AND CONTROL DEVICE FOR A MEASURING DEVICE

(75) Inventors: Gerhard Kern, Götzis (AT); Klaus Schneider, Dornbirn (AT); Pius Vorburger, Berneck (CH); Jürg Hinderling, Marbach (CH)

(73) Assignee: Leica Geosystems AG, Heerbrugg (CH)

( * ) Notice: Subject to any disclaimer, the term of this patent is extended or adjusted under 35 U.S.C. 154(b) by 333 days.

(21) Appl. No.: 10/528,803

(22) PCT Filed: Apr. 14, 2003

(86) PCT No.: PCT/EP03/03851

§ 371 (c)(1),
(2), (4) Date: Apr. 7, 2005

(87) PCT Pub. No.: WO2004/036145

PCT Pub. Date: Apr. 29, 2004

(65) Prior Publication Data

US 2006/0158423 A1    Jul. 20, 2006

(30) Foreign Application Priority Data

Oct. 12, 2002    (EP) .................................. 02022820

(51) Int. Cl.
*G01C 3/08*    (2006.01)
(52) U.S. Cl. ................... 356/5.02; 396/82; 396/142
(58) Field of Classification Search ........... 356/5.02
See application file for complete search history.

(56) References Cited

U.S. PATENT DOCUMENTS 5,219,226 A    6/1993    James (Continued)

FOREIGN PATENT DOCUMENTS

| DE | 90 07 731 U1 | 11/1994 |
|----|---|---|
| EP | 0 481 278 A1 | 4/1992 |
| EP | 1 314 959 A1 | 5/2003 |

(Continued)

OTHER PUBLICATIONS

Joeckel et al.,"Elektronische Entfernungs—und Richtungsmessung"[Electronic Distance and Direction Measurement], 4th Edition, Verlag Konrad Wittwer, Stuttgart 1999.
Rüeger, "Electronic Distance Measurement," 4th Edition, Springer-Verlag, Berlin, Heidelberg {1996}.

*Primary Examiner*—Thomas H. Tarcza
*Assistant Examiner*—Tim Brainard
(74) *Attorney, Agent, or Firm*—Oliff & Berridge, PLC (57) ABSTRACT

The invention relates to an electronic display and control device for a geodesic measuring device containing capturing means and representation means for detecting and reproducing a measuring range together with input means for controlling the measuring processes. The radiation beam necessary for said measuring processes is emitted by a radiation source and is influenced in the direction of emission thereof by orientating means such that it can be orientated onto a selected target within the measuring range without the capturing means being displaced. Determining the target and initiating the measuring process occurs by displacing a position mark on a screen. A suitable operating module con be produced by suitably combining the representation means with means for inputting data. Said module can also be used independently from and separately from a measuring device which is connected thereto by communication means. The use of said module together with a plurality of measuring devices as sensor components, enables the formation of remote-controlled geodesic measuring systems.

38 Claims, 7 Drawing Sheets

U.S. PATENT DOCUMENTS

| | | | |
|---|---|---|---|
| 5,421,096 A | 6/1995 | Ross | |
| 2002/0148549 A1* | 10/2002 | Bleckmann et al. | 156/73.3 |
| 2003/0016247 A1* | 1/2003 | Lai et al. | 345/764 |
| 2003/0047683 A1* | 3/2003 | Kaushal | 250/330 |
| 2003/0099470 A1* | 5/2003 | Tseng | 396/61 |
| 2003/0122078 A1* | 7/2003 | Fritzel | 250/336.1 |

FOREIGN PATENT DOCUMENTS

| | | |
|---|---|---|
| JP | A-2-130409 | 5/1990 |
| JP | A-3-167412 | 7/1991 |
| WO | WO 99/60335 | 11/1999 |
| WO | WO 9960335 A1 * | 11/1999 |

* cited by examiner

ELECTRONIC DISPLAY AND CONTROL DEVICE FOR A MEASURING DEVICE

The invention relates to an electronic display and control device according to the precharacterizing clause of claim 1 and a geodetic measuring device according to claim 15, a module component according to claim 23 and a geodetic surveying system according to claim 24.

A large number of measuring devices has been known since antiquity for the recording of properties of defined points in a measuring environment, in particular of data having a three-dimensional reference. The location of a measuring device in addition to any existing reference points, and direction, distance and angle relative to measuring points, are recorded as three-dimensional standard data. Improvements to date generally related to the use of new technical methods having higher accuracy and speed.

A generally known example of such measuring devices is the theodolite. An overview of geodetic measuring devices of the prior art is given in "Elektronische Entfernungs-und Richtungsmessung" [Electronic distance and direction measurement] by R. Joeckel and M. Stober, 4th Edition, Verlag Konrad Wittwer, Stuttgart 1999, and "Electronic Distance Measurement" by J. M. Rüeger, 4th Edition, Springer-Verlag, Berlin, Heidelberg, 1996. However, such devices always require a user who works directly at the device and sets up the measuring device, generally with the aid of special aligning means, such as, for example, optical telescopes, for the points to be measured.

Because the beam path is generally to be utilized for the human eye and the measuring process together, such devices have to be technically designed in the manner of a telescope, resulting in limitations of the embodiment.

By combining a geodetic device with a screen which can be moved relative to this device or can be mounted independently, advantages can be achieved from the ergonomic and safety points of view. The conventional eyepiece of the telescope is replaced by electronic recording means, so that the operator no longer need be tied to the device as in the past and furthermore, the requirements or limitations resulting from the use of the human eye can be eliminated. The device and the measurements to be carried out therewith are controlled electronically via the display of the screen and a suitable input device for data and control commands. The measurements can then be carried out after alignment by various methods, such as, for example, by measurement of the bearing with supplementary distance measurement by triangulation or by means of a laser.

The patents JP 02130409 A and JP 03167412 A disclose a combination of a theodolite with a video camera, by means of which rapid and exact three-dimensional measurements are to be permitted. Here, by means of two theodolite/video camera combinations, recordings of images by the respective camera and angle measurements by means of theodolites are made simultaneously. In each case, the axes of video camera and theodolite are parallel so that the angle measurement of a theodolite is linked to the images recorded by the camera of this combination. The three-dimensional positions of the imaged objects can be derived from at least two images recorded at different angles.

European Patent Application EP 0 481 278 and the associated German Utility Model DE 90 07 731 U disclose a measuring device for position determination of points in space which can be optoelectronically displayed. The measuring device has a movable measuring head with a camera as a target acquisition device and a distance measuring device whose sighting axes are precisely aligned with one another. A target point is surveyed by acquiring it with the camera, and the camera axis is then aligned with the target point. Precise alignment of the distance measuring device is also associated therewith, so that its axis likewise points to the point to be surveyed.

The European Patent Application having the Application No. 01127378 of the same Applicant describes a measuring device in which operation is effected in an ergonomically advantageous manner by a separation of recording means and display means. By a suitable combination of the display means with the means for inputting data, it is possible to create a separate handling module which can also be used independently of and remote from the measuring device and is connected to the latter via communication means. The use of such a module together with a plurality of measuring devices as sensor components permits the design of remote controllable geodetic surveying systems. Within a displayed measuring range, it is possible to move a position mark, by means of which parameters of a measuring process can be established and the measuring process initiated. The following measuring process aligns the components of the measuring device which are required for the measurement with the position determined by the position mark, and the measurement is carried out.

International PCT Application WO 99/60335 discloses a geodetic device which acquires a target range by means of a camera and displays it on a screen. Within this range, targets can be selected and their distance can be measured by a distance measuring means by aligning the axis of the distance measuring means as a complete device with the selected target. Camera and distance measuring means are moved either together or independently of one another by means of motors.

All devices of the prior art which have been described require the movement of the entire device or of a measuring head which comprises both recording and measuring means or at least complete measuring devices for each measurement to a point. For each measuring process, it is therefore necessary to move components of the measuring device which are comparatively large and heavy and generally require electric servo motors, so that there is an increased demand with respect to time and energy. Particularly for systems suitable for field use, however, the energy consumption is a parameter which influences the period of use and reliability, so that the reduction thereof has immediate advantages. Moreover, the frequent movement of relatively large and comparatively heavy parts leads to increased wear and requires wear-reducing or wear-resistant technical design of the components.

A further disadvantage is the necessity that each device has to have its own aligning means in order to align the axis of the measuring device with a target. Even if, for a specific surveying task, all targets are always within the acquisition range of the recording means, a movement of the device or at least of the two components, recording means and measuring device, must be effected for each measuring process.

A similar disadvantage arises in the case of automatic target tracking. If a target is actively illuminated by emitted radiation and is identified or tracked on the basis of the reflected radiation, in the case of devices of the prior art either the recording means have to be continuously moved or coordination of the movements of recording and illuminating means must be effected, which has the disadvantages already described.

The object of the present invention is to provide a device in the form of an electronic display and control device for a measuring device or in the form of a measuring device which reduces the movements required for measurement or the time and energy required therefor.

A further object is to reduce the complexity of the design of an opto-electronic display and control device or of a measuring device of the generic type.

A further object is the reduction in the size of an electronic display and control device or of a measuring device of the generic type.

A further object is the provision of the possibility for target tracking with active illumination within the acquisition range of a measuring device without changing the field of view.

These objects are achieved, according to the invention, by the characterizing features of claims 1 to 15 and by the characterizing features of the subclaims or the achievements are further developed.

The invention is based on the concept of effecting a movement of the beam required for measurement within the acquisition range of an optical system without requiring an otherwise necessary movement of the entire optical system or relatively large components for this purpose. This is permitted by the use of optical components of the electronic recording means for the emission of the radiation beam. By means of the radiation emitted via the optical system of the recording means, it is possible in principle to survey all targets acquired and shown in the display, without having to move the optical axis of the recording means or a further independent component of the measuring device. The recording means refer to the devices for image production, which are used for establishing the target point for a measuring point. The detectors required for carrying out the measurement can also be installed in further measuring devices so that, for example, fixing and illumination of a target by means of radiation is effected by a measuring device having an electronic display and control device according to the invention, but the measurement is carried out by one or more further devices. In the following description by way of example, it is to be assumed, unless stated otherwise, that all components required for the measuring process are integrated in one measuring device.

The invention thus relates in the wider sense to all measuring devices which are optically aligned with measuring points by alignment means to be handled directly by a person.

The term "geodetic measuring device" is always to be understood in this context as meaning generally a measuring instrument which has devices for measuring or checking data with a three-dimensional reference. In particular, this relates to the measurement of distance and/or direction or angles to a reference or measuring point. In addition, however, further apparatuses, for example components of satellite-supported position determination (for example GPS, GLONASS or GALILEO) may be present, which can be used for supplementary measurements or data recording. In particular, such a geodetic measuring device is to be understood here as meaning theodolites and also so-called total stations in the form of tacheometers with electronic angle measurement and electro-optical distance measuring device. The invention is also suitable for use in specialized devices having similar functions, for example in military aiming circles or in the industrial monitoring of structures or processes; these systems are hereby likewise covered by the term "geodetic measuring device".

The image of a measuring range to be acquired and of measuring points to be sighted is focused via an optical system on electronic recording means and the image is visualized by display means. The rough alignment of the measuring device or of the theodolite can now be effected by the positioning of a position mark on a screen. This position mark can be moved by the various devices, as are customary, for example, also in the computer sector for controlling screen pointers. Depending on the mode chosen, tracking or alignment of the entire measuring device and/or the implementation, according to the invention, of a measuring process to the point defined by the position mark can be effected by movement of the position mark.

For example, it is possible to establish various measuring points which are then automatically moved away after completion of the input, or a measuring process for the parameters set in each case and to be recorded is carried out directly to the actual point by positioning of the position mark.

The data and results of the measuring process can be displayed on the screen. This display is possible in the form of an overlaid text or in separate display fields. The latter may be in the form of separate parts of the screen which represent, for example, enlarged image sections or reference points with which an alignment is to be effected.

The use of a touch-sensitive flat screen moreover makes it possible to dispense with special input means, so that the display and input means can be made compact and modular. A further possibility for realizing the display and input means consists in linking devices which can also be used for other applications. For example, it is possible to make use of further additional functions via an interface with communication networks or the use of a standard computer, in particular of a portable laptop or notebook. By using computers, additional, optionally universally applicable software can be employed. Moreover, recorded measured data can immediately be stored in the available memories and, after disconnection from the geodetic measuring device, can also be used in other applications. These advantages can be combined with an internet link, permitting additional data transmission or remote control.

The implemented division of the telescope provided to date with a direct view into recording and display means makes it possible for the user to assume a convenient, economically advantageous position regardless of the alignment of the recording means. Furthermore, a measuring device can be positioned in regions which have not been usable to date, for example in corners or narrow passages.

If the display and input means have a modular design, they can be structurally separated from the actual geodetic measuring device. A link to the geodetic measuring device, which now substantially comprises only a housing and the components of the objective with sensor elements together with associated control components, can be produced by communication means, for example wire or radio connections. In this context, wire connections are always to be understood below as meaning all flexible communication connections which serve for the transmission of data, but in particular fibre optic and copper cables.

This division now permits the control of a large number of geodetic measuring devices as pure sensor units by means of a central control and evaluation unit. The latter can be protected from the weather, for example can be housed in a vehicle. In addition to the advantages for device and operator, the transfer of the load to a vehicle also permits the use of further additional components which, if mounted on the individual measuring devices, would prohibitively increase its weight. The use of a plurality of sensor units permits simplified, simultaneous measurements to common or different points, alignment of the geodetic measuring devices with one another or a successive use in which only a part of the sensor units is ever used for measurement while the other part is transferred to other locations. The display of the measuring ranges of simultaneously used sensor units can be effected in succession on the same screen or simultaneously on a screen in separate display areas, for example using the window or split screen technique.

By means of the electronic display, derivation of the horizontal and vertical angles to a target point as shown on the display and selected by the position mark is possible without problems. Using these coordinates, the beam of the measuring device is guided to the target point with unchanged alignment of the recording means. In one embodiment, the insertion of the beam in the emission direction is effected before the objective of the recording means, so that the optical components associated therewith are also utilized by the radiation to be emitted. By using a common objective, the number of housing openings and of lenses can be reduced, which contributes to the structural simplification.

The required influencing of the beam can in principle be effected by a movement of the radiation source in the case of a fixed optical system or by movement or change of optical components in the case of a fixed radiation source. Moreover, however, radiation source and optical component can also be simultaneously moved according to the invention.

Suitable means for moving the radiation source are available, for example, in the form of piezoelements, electrostatically adjustable actuators or miniaturized motors. The influencing of the radiation beam by movement or change of the optical components can be effected in a variety of ways. Firstly, it is possible in principle to use the same elements as can also be used for movement of the radiation source. Secondly, it is also possible to change the optical properties of that region of an optical component which is affected by the radiation beam. One possibility for this consists in changing the angle of a reflective surface, which can be effected by tilting and rotating a mirror, turning a rotatable double wedge or deforming a surface. Deformable mirror surfaces in the form of so-called continuous membrane deformable mirrors (CMDM) are disclosed, for example, in the patent U.S. Pat. No. 6,38.4,952.

The electronic display and control device according to the invention, a measuring device according to the invention and a geodetic surveying system are described in detail below, purely by way of example, with reference to embodiments shown schematically in the drawing. Specifically.

Figure 1:
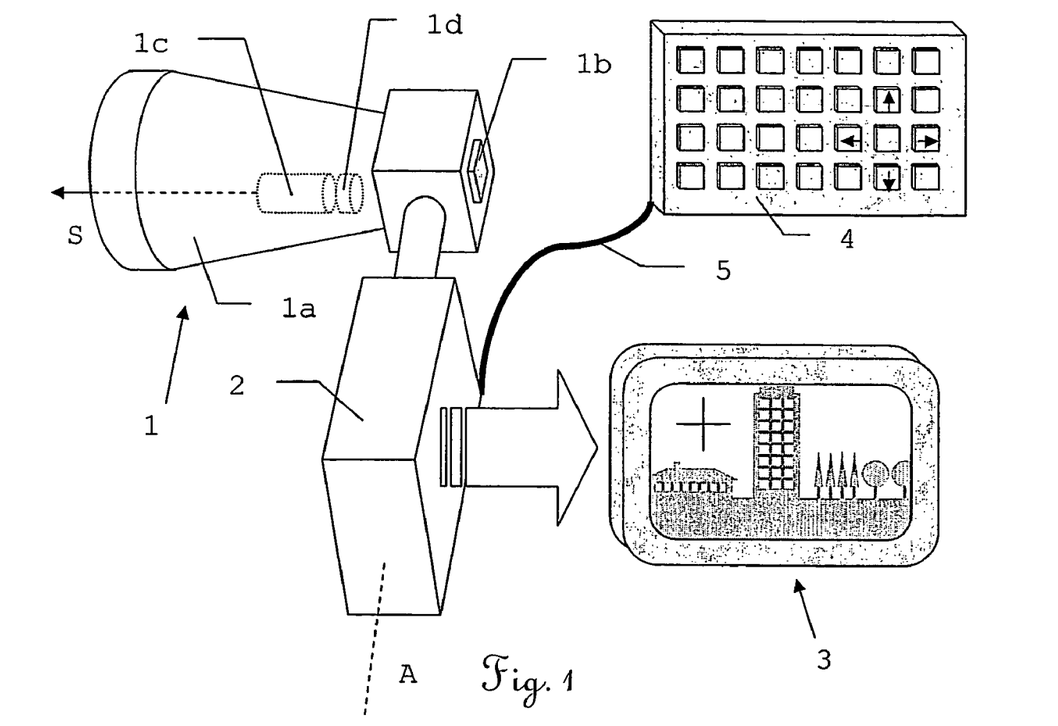
FIG. 1 shows the diagram of the components of an electronic display and control device according to the invention.

FIG. 1 shows the diagrammatic representation of the components of an electronic display and control device according to the invention, as may be used, for example, for the alignment of various types of measuring devices and for the recording of measured data. Objective part 1a, together with an electronic recording device 1b, forms the recording means 1 required for the measuring process. The direct view for the human eye is replaced by suitable means for image recording, for example a video or CCD camera. In addition to constructional advantages, these electronic means also permit selective or extended use of spectral ranges which are not directly accessible to the human eye. In the embodiment shown here by way of example, a radiation source 1c and alignment means 1d are additionally integrated in the recording means 1, so that parts of the recording means 1 can be used for the beam paths of both recording device 1b and the radiation source 1c.

The recording means 1 shown can moreover have further instruments with an at least partly identical beam path or in coaxial arrangement. The omission of a direct view results in constructional advantages through the reduced space requirement and the fact that optical image inversion is no longer necessary, as well as the now omitted restrictions with regard to the human eye, for example through the necessity of eye protection in the case of laser radiation.

The recording means 1 are connected directly to a display unit 2 which is pivotable relative to said recording means about a horizontal axis A and holds suitable display means. A section of the measuring range captured by the recording means 1 is shown on a screen 3 integrated in the display unit 2, as display means whose image is shown separately and rotated here for the sake of better clarity. The input of data for control of the recording means 1 with the display unit 2 and of the measuring process is effected, for example, via a keyboard 4 as input means. Alternatively or in addition, however, other input or control means, for example a joystick or trackball or other movement-sensitive devices can also be used. The keyboard 4 is connected to the display unit 2 via a cable 5. However, another possibility for connection comprises wireless communication, for example by using remote infrared or radio operation. The data relating to the measuring process and for the control thereof are input via the keyboard 4. For example, consecutive numbers, the current project designation or the user identification can be input for the measurements as background data of the measuring process. For the evaluation of the data acquired by the measuring process, it is possible to use an electronic computer with memory devices which are integrated, for example, structurally in the housing of the keyboard 4.

The measuring process can moreover be directly controlled via the keyboard 4 by inputting the necessary commands, for example by positioning a cursor. By suitable input or control means, the recording means 1 are then roughly aligned and adjusted so that intended measuring processes can be carried out. Generally known means, such as, for example, servo motors or other actuators, can be used for control. If target points are located within the acquisition range of the recording means 1, it is possible, according to the invention, to dispense with a movement of the recording means 1. The target points are now surveyed by influencing the radiation beam S emitted by the radiation source 1*c* by the alignment means 1*d*, with unchanged alignment of the recording means 1, so that said beam captures the target point and a measurement is permitted.

Various embodiments of the invention which are suitable for uses in a theodolite or another geodetic measuring device are shown in FIGS. 2-5, but not definitively.

Figure 2:
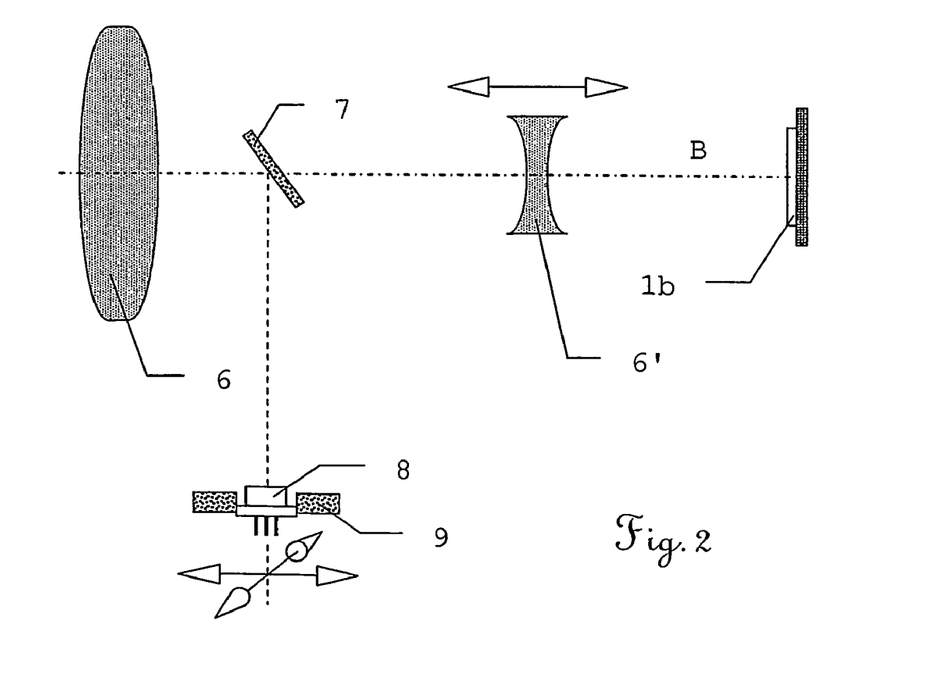
FIG. 2 shows a first realization form of the alignment means according to the invention, in which the radiation source is designed to be movable.

FIG. 2 schematically shows a first realization form of the alignment means according to the invention in which the radiation source is designed to be movable. The recording means include, as substantial components, a recording device 1*b* onto which a measuring range is focused via an objective lens 6 and a focusing element 6'. Here, the objective lens 6 describes a suitable objective which may also be composed of a plurality of optical components. Equally, the focusing element 6' is shown here purely by way of example as being present behind the objective lens 6. However, such an element can also equally be arranged at another point in the beam path, in particular in the objective. The focusing element 6' can be formed or can be controlled and moved, for example, as an autofocus system or as a precise refocusing element. A deflecting mirror element 7 is present in the beam path of this recording means, which is defined here by the optical axis B. The radiation which is emitted by a laser diode 8 as radiation source is emitted via this deflecting mirror element 7 and the subsequent objective lens 6 in the form of a radiation beam. In the case of fixed positioning of objective lens 6, the emission direction of the radiation can now be controlled by a movement of the laser diode 8, preferably in a plane. Such a movement can be effected by suitable miniaturized actuators or servo elements, such as, for example, piezoelectric elements, as alignment means 9. The alignment of the radiation beam with a target point can now be effected by movement of the laser diode 8 with unchanged alignment of the optical axis B. Alternatively or in addition to the movement in a plane, the laser diode 8 can also be tilted so that the angle relative to the deflecting mirror element 7 is varied for aligning the radiation beam. The radiation to be emitted and the recording device 1*b* thus use the objective lens 6 as a common optical component.

Figure 3:
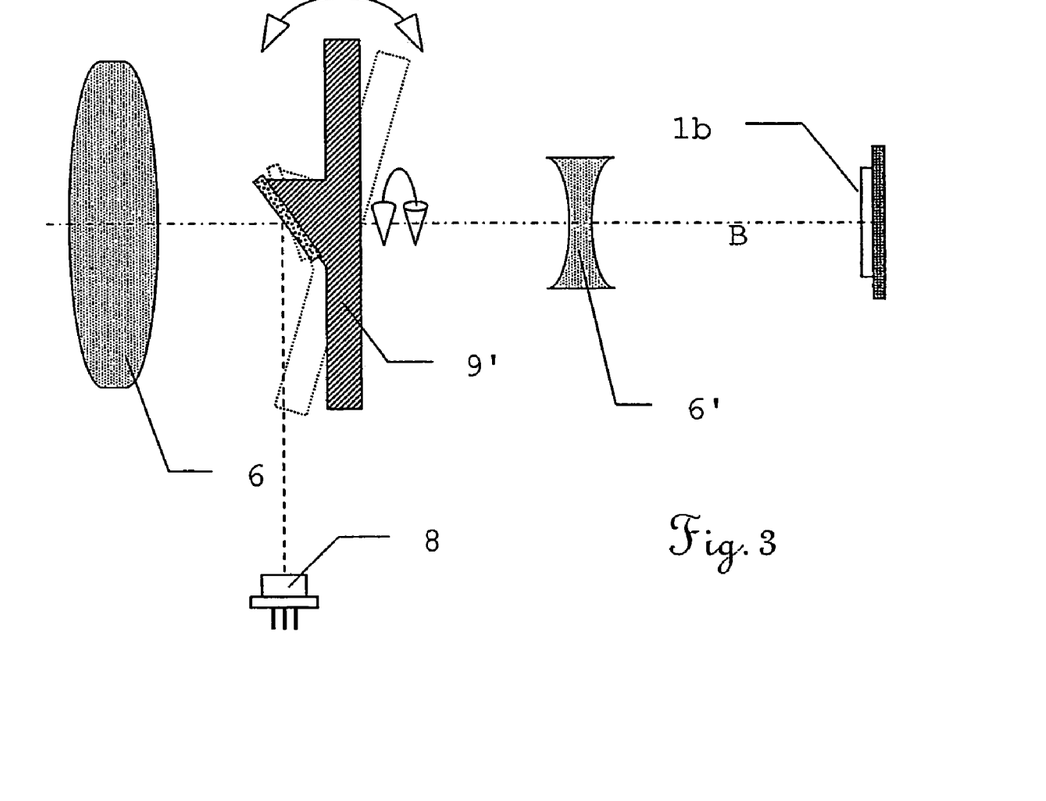
FIG. 3 shows a second realization form of the alignment means according to the invention, in which the emission direction of the radiation beam can be influenced by a movable mirror.

A second realization form of the alignment means according to the invention, in which the emission direction of the radiation beam can be influenced by a movable mirror as alignment means 9', is shown in FIG. 3. The recording means once again have an objective lens 6, a focusing element 6' and a recording device 1*b*. In this embodiment, however, the laser diode 8 is fixed, whereas the mirror element as alignment means 9' is designed so as to be rotatable and tiltable. As a result of the movement of the mirror element, the alignment of the emitted radiation beam relative to the optical axis B can now be influenced and controlled. Suitable micropositionable mirror elements are available, for example, in the form of mirrors which can be inclined electrostatically relative to two axes. Instead of a rotatable and/or tiltable mirror, deformable optical elements, such as, for example, deformable mirror surfaces in the form of so-called continuous membrane deformable mirrors (CMDM), can also be mounted in the same place.

Figure 4:
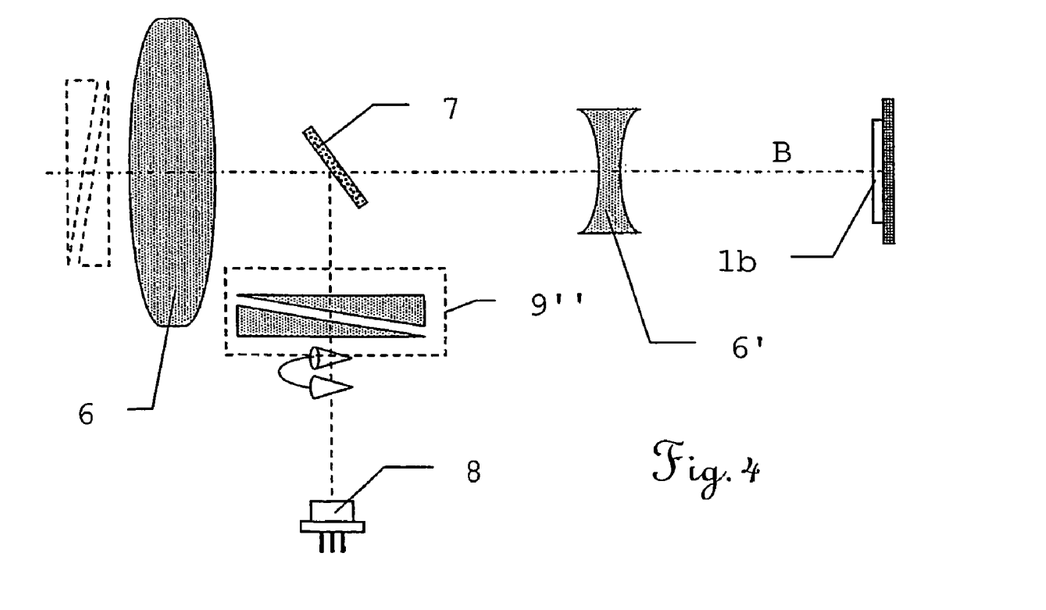
FIG. 4 shows a third realization form of the alignment means according to the invention, in which the emission direction of the radiation beam can be influenced by a double wedge.

FIG. 4 describes a third realization form of the alignment means according to the invention, in which the emission direction of the radiation beam can be influenced by a double wedge. Once again, the recording means have an objective lens 6, a focusing element 6' and a recording device 1*b*. The deflection mirror element 7 and the laser diode 8 are both fixed. Two wedges rotatable relative to one another and in the form of an optically effective double wedge now serve as an alignment means 9". By positioning the two wedges relative to one another, the radiation is influenced by refraction in a manner known per se and the radiation beam is thus deflected and is aligned with a target point. As an alternative to the positioning shown, between deflection mirror 7 and laser diode 8, the double wedge can also be mounted at other locations in the beam path. A possible position before the objective lens 6 is shown by means of dashed lines as a further example.

Figure 5:
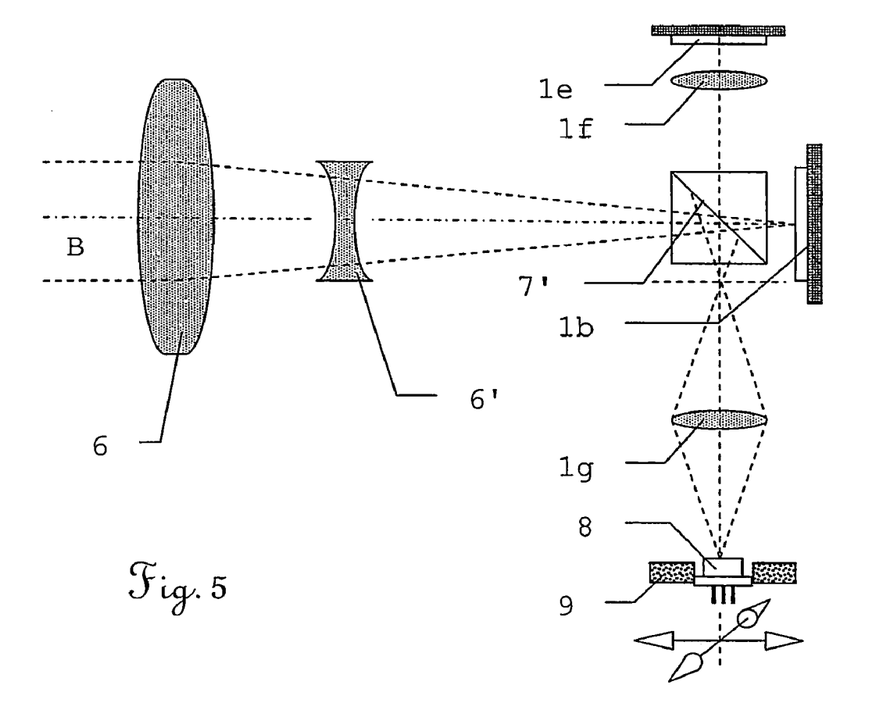
FIG. 5 shows a fourth realization form of the alignment means according to the invention, in which the radiation source is designed to be movable and can be checked via a calibration control device.

FIG. 5 shows a fourth realization form according to the invention, in which the radiation source is designed to be movable and can be checked with respect to its zero position by means of a calibration control device. The recording means have an objective lens 6, a focusing element 6' and a recording device 1*b*, the focusing element 6' being arranged directly after the objective lens 6. The radiation emitted by the laser diode 8 which can be positioned by servo elements as alignment means 9 passes via a lens 1*g* and a deflection mirror element 7' designed as a beam splitter and is both emitted by the focusing element 6' and the objective lens 6 and guided by means of a further lens 1*f* onto an image sensor 1*e*. This embodiment thus constitutes a modification of the embodiment shown in FIG. 2. By means of the additional image sensor 1*e*, the positioning of the laser diode 8 can be calibrated, or checked with regard to the calibration, independently of the detection via the recording device 1*b*.

Figure 6:
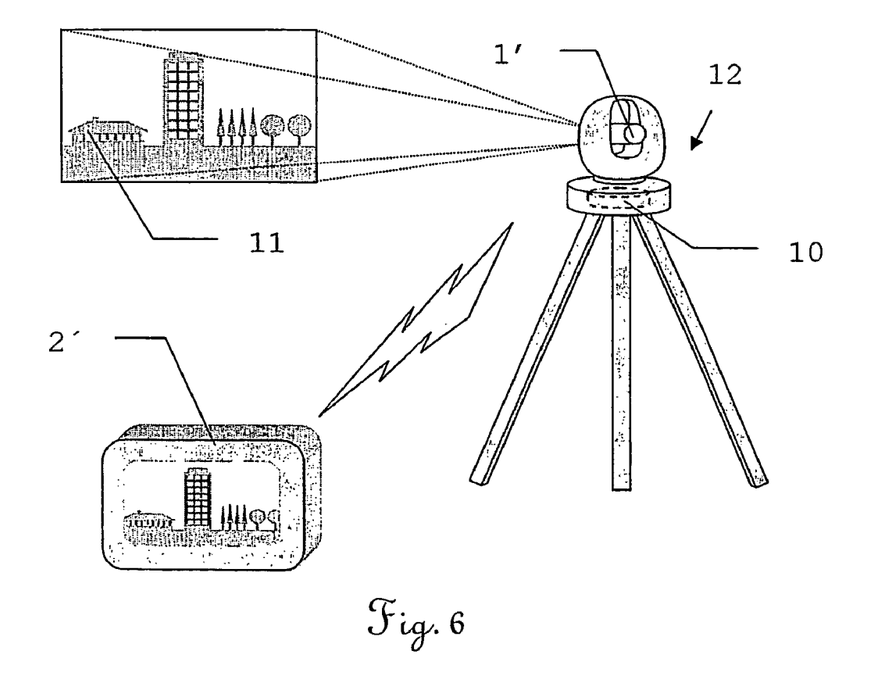
FIG. 6 shows a diagram of a geodetic measuring device according to the invention, with separation of sensor unit and processing unit.

FIG. 6 shows an embodiment, according to the invention, of a geodetic measuring device 12 having a modular touch-sensitive flat screen 2' as a display unit, in which electronic evaluation means are also integrated. The geodetic measuring device 12 is connected to the flat screen 2' by a wireless communication link so that the two components can also be used a great distance apart. The recording means 1' or the recording means of the geodetic measuring device 12 which influence the radiation beam are remote controlled by the commands transmitted via flat screen 2'. The acquired measuring range 11 is in turn transmitted to the flat screen 2' and displayed there. The recording means 1' can be moved by orientation means 10 so that the acquired measuring range 11 can be changed. If the measuring range includes all target points to be surveyed, for example in the area of monitoring of structures, or if, for other reasons, it is intended to dispense with a change of the acquired measuring range 11, for example for achieving as simple a device design as possible, it is also possible alternatively to realize a measuring device according to the invention without orientation means 10.

Figure 7:
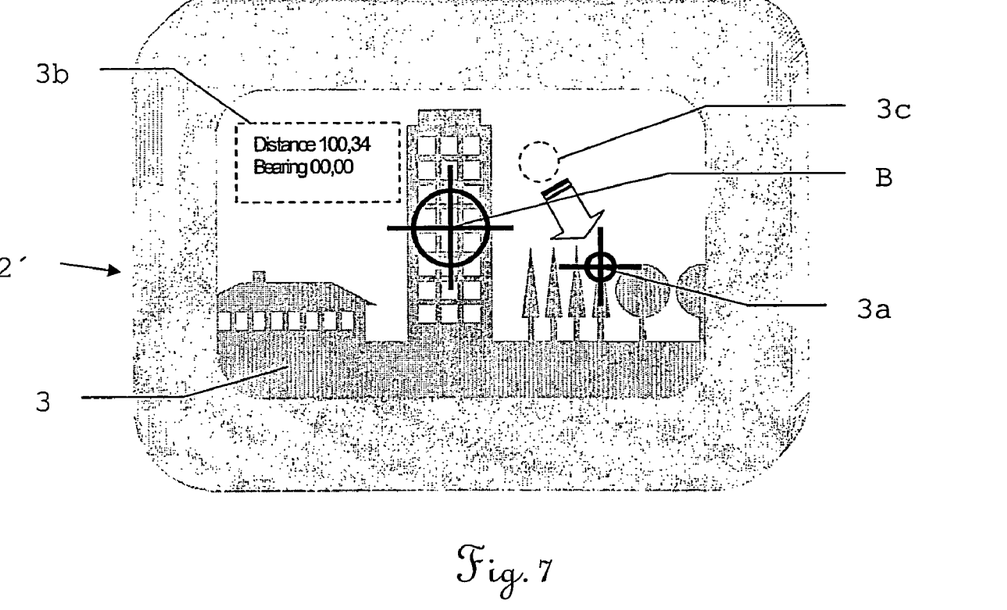
FIG. 7 shows the diagram of the cooperation, according to the invention, of position mark and radiation beam in the representation of a flat screen.

An integrating embodiment is the combination of various components in a touch-sensitive flat screen 2' as a display unit, shown in FIG. 7. For example, the functions of screen 3 and keyboard can be combined in this element. The flat screen 2' has a screen 3 as display means, which has subdivisions into further display fields 3b. For example, enlarged sections of the measuring range or, as shown here, data of the measuring process can be shown in these display fields 3b. The optical axis B of the recording means is shown in the centre of the screen 3. Said axis defines the midpoint of the display of the acquired measuring range.

The measuring process is controlled by means of a movable position mark 3a which can be moved within the screen 3. In this embodiment of the touch-sensitive flat screen 2', touching with the finger or an object is sufficient to enable the position mark 3a to be moved. The radiation beam can be moved within the acquired measuring range by the alignment means so that said beam is aligned with a target point established by the position mark 3a. In the display on the screen 3, this corresponds to a movement of the position 3c of the radiation beam to the position mark 3a.

Depending on the specific design or chosen mode, a measuring process can be initiated simply by moving the position mark 3a. In the scenery shown, a movement of the position mark 3a from the optical axis B to the top of one of the trees as an end position would thus automatically initiate a measurement of distance and direction to this target point thus established. This measurement is now effected with fixed optical axis by a movement of the radiation beam to the target point and a measuring process associated therewith. In addition, for example, further data can be recorded. For example, it is possible to measure or to calculate and to specify the angle and the absolute difference in height between optical axis B or another reference point and the target point. Alternatively, a path comprising a plurality of target points, which is automatically travelled after a start command, can also be established by the movement of the position mark 3a. For this purpose, the radiation beam is aligned successively with the target points by the alignment means and in each case a measuring process is carried out. In the display, position 3c of the radiation beam thus travels in succession to the points selected by the position mark 3a. In principle, however, movements of the recording means can also be associated with the movement of the radiation beam within the measuring range. For example, coordinates of a point to be surveyed can be input via a keyboard. If this target point is located outside the acquired measuring range, the recording means are thus roughly aligned with this target point, it not being necessary for the optical axis B to point at this point. The surveying is then effected by a subsequent and exact alignment of the radiation beam with this target point, which, after the recording means have been set up, is now located within the measuring range.

Figure 8:
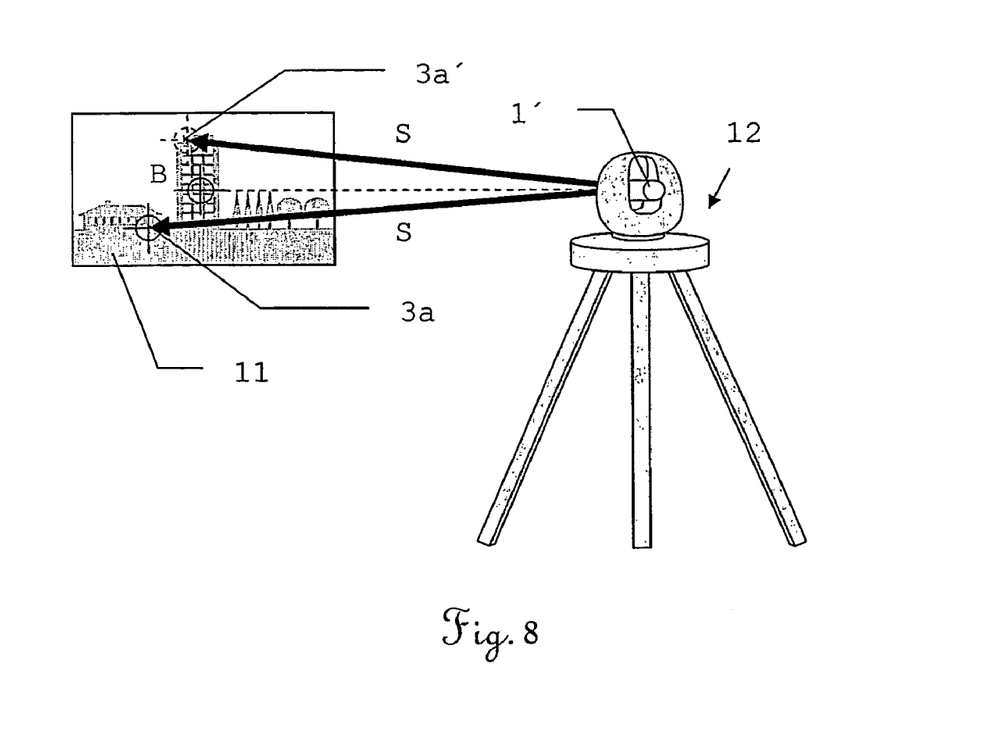
FIG. 8 shows the diagram of the cooperation, according to the invention, of position mark and radiation beam in the surveying of two targets using a theodolite.

FIG. 8 shows the cooperation, according to the invention, of position mark and radiation beam in the surveying of two targets using a theodolite as geodetic measuring device 12. By means of the position mark 3a, two target points which are defined by the actual position of the position mark 3a and an earlier position 3a' are established within the measuring range 11 established by the alignment of the optical axis with a point. Although the optical axis B of the recording means remains aligned with the original point in the middle of the measuring range 11, a measuring process to the selected target points within the measuring range 11 is effected in each case as a result of an alignment of the radiation beam S.

Figure 9:
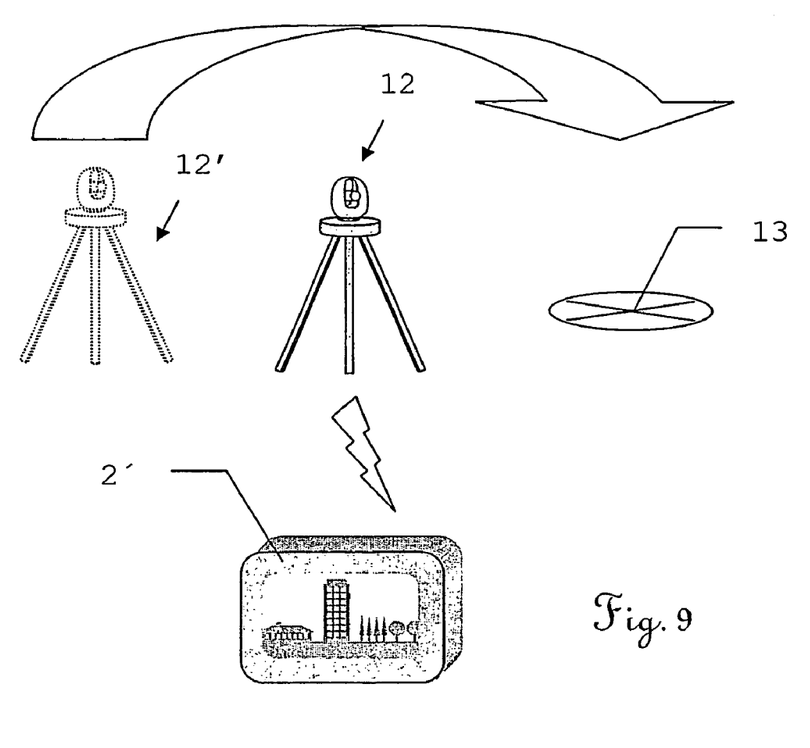
FIG. 9 shows the diagram of the use of a geodetic surveying system according to the invention, comprising a plurality of geodetic measuring devices for successive surveying.

The use of a plurality of geodetic measuring devices 12, 12' designed in this manner in a geodetic surveying system according to the invention is shown schematically in FIG. 9.

In a successive method, a geodetic survey is carried out alternately with the geodetic measuring devices 12, 12'. The elements required for operating the measuring devices 12 and 12' can be designed in the form of module components in which input means and/or display means are integrated. An example of the integration of input and display means in a common module component is a touch-sensitive flat screen 2'. It is also possible, for example, to use further module components which have only screens as display means and serve for tracking and monitoring the ongoing measuring process. While there is radio contact between such a touch-sensitive flat screen 2' as a modular input means and the geodetic measuring device 12 and a measurement is carried out, the second geodetic measuring device 12' or even further or other sensor units can be brought to a new reference point 13. In this system according to the invention, the geodetic measuring devices 12, 12' or even other, similarly designed sensor units can be kept simple and hence economical by dispensing with separate display and input means. Only one person, who can be located remotely and protected from weather influences, is required for operating the input means. Owing to the successive use, which, in view of the simple transfer of the sensor units, involves no special training requirements for the personnel, and the remote-controlled fine positioning possible via an integrated plumb line, surveys can be carried out more quickly and hence more economically than in the past.

Because the alignment of the radiation beam is variable relative to the optical axis, there is also a need for tracking or adapting the alignment of the receiving device. In principle, emission and reception of the radiation beam in the case of the device according to the invention can be designed to be independent of one another. For example, the receiving device can be electronically controlled and moved by a circuit or a computer so that it takes into account the receiving conditions resulting from the alignment of the radiation beam. However, for reasons of the technical complexity and of the design of the device with regard to size, weight and energy consumption, it is expedient either to fix a position of radiation source and receiving device and directly to manipulate the alignments of emitted and received radiation beam or to mount radiation source and receiving device on a common support element and to move this support element. Various examples of embodiments of these two alternatives are shown in FIGS. 10 to 13.

Figure 10:
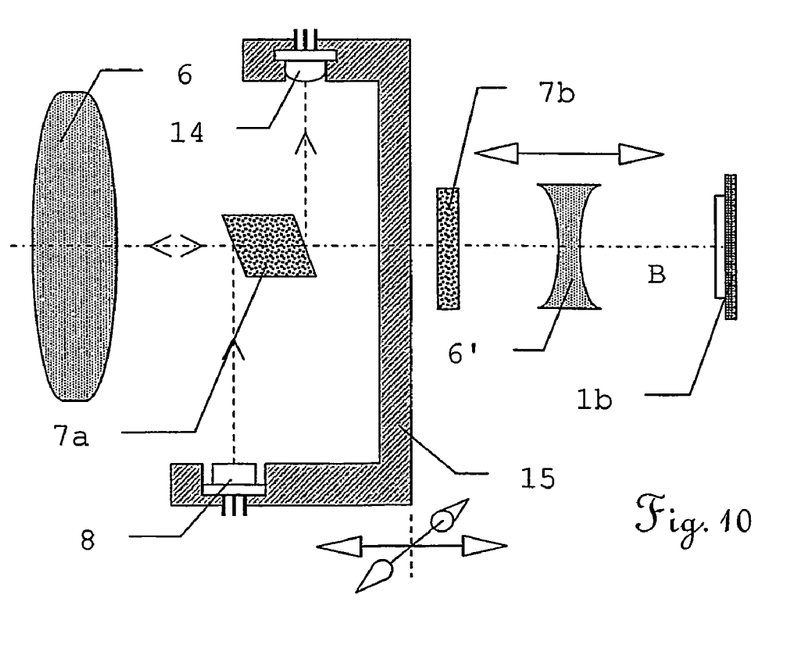
FIG. 10 shows the diagram of a first embodiment of the integration of transmitter and receiver on a support element.

FIG. 10 shows a first embodiment of the integration of a laser diode 8 as a radiation source and of a receiving device 14 on a common support element 15. The movable laser diode 8 emits radiation onto a first inclined surface of a double-sided deflection mirror element 7a, from which this radiation is emitted via an objective lens 6 as a radiation beam. The radiation received again via the objective lens 6 after reflection of the radiation beam is guided from a back-reflecting mirror element 7b onto the second surface of the deflection mirror element 7a and from there to the receiving device 14, which, for example, may consist of a photodiode. Both laser diode 8 and receiving diodes 14 are held by a common support element 15 as alignment means and can be moved in the same manner by said alignment means, laser diode 8 and receiving device 14 being arranged in this example with their emission direction and receiving direction opposite to one another. Owing to the movement of the same kind, the positioning of radiation source and receiving device 14 was effected in a manner tailored to one another, with the result that no second control device with the associated actuators is required. The focusing is effected in this embodiment by means of an adjustable focusing element 6', which is arranged behind the objective lens 6 in the beam path.

Figure 11:
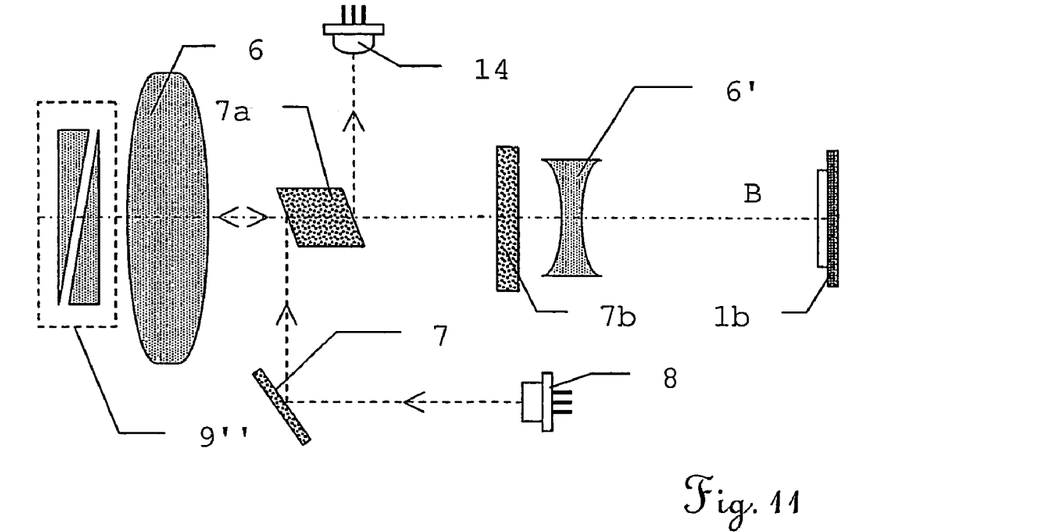
FIG. 11 shows the diagram of an embodiment having a fixed position of transmitter and receiver.

FIG. 11 shows an alternative embodiment comprising fixed positioning of laser diode 8 and receiving device 14. The laser diode 8 in a fixed position emits radiation via a deflection mirror element 7 onto a first inclined surface of a double-sided deflection mirror element 7a, from which this radiation is emitted via an objective lens 6 with subsequent mutually rotatable wedges as alignment means 9". This embodiment thus resembles the version described in FIG. 4. The radiation received again via the objective lens 6 after reflection is guided by a back-reflecting mirror element 7b onto the second surface of the deflection mirror element 7a and from there to the receiving device 14 in a fixed position.

Figure 12:
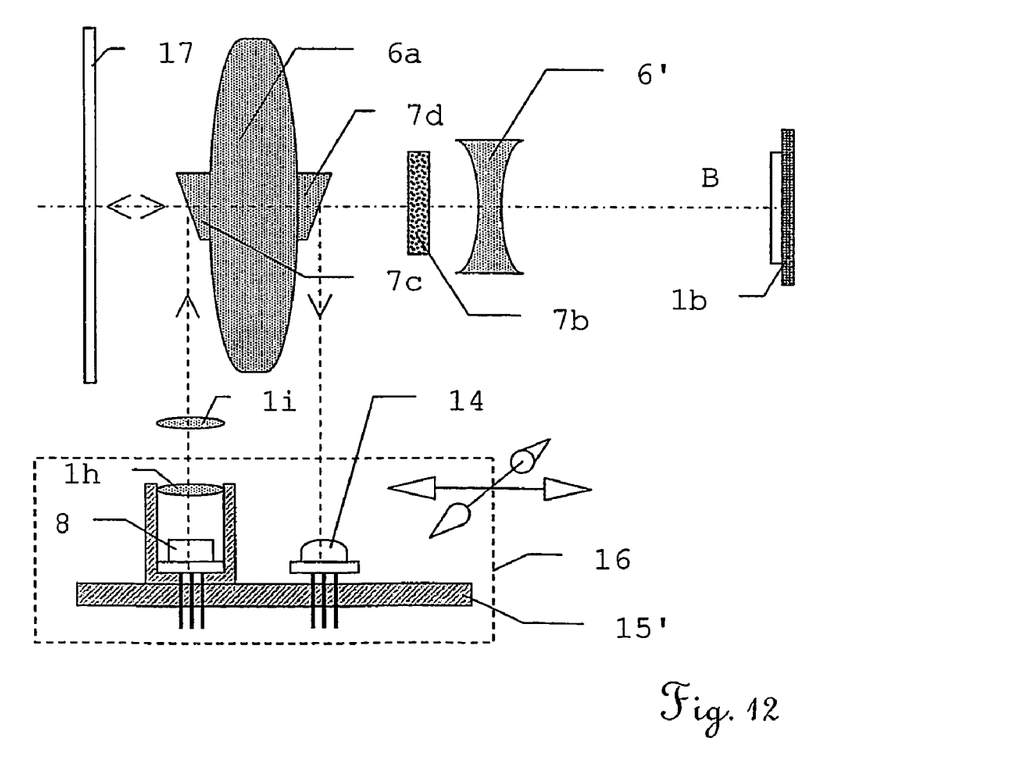
FIG. 12 shows the diagram of a second embodiment of the integration of transmitter and receiver on a support element and FIG. 13 shows the diagram of a third embodiment of the integration of transmitter and receiver on a support element and an additional internal optical focusing of the radiation beam onto the recording device.

FIG. 12 shows the diagram of a second embodiment of the integration of radiation source and receiving device 14 on a support element 15 as integrated transmission and receiving unit 16. In this embodiment, the radiation emitted by the laser diode 8 which can be positioned by a movement by means of support element 15' is emitted via the deflection mirror element 7c, mounted before the objective lens 6a, through a cover element 17 as a radiation beam. The radiation is guided within the transmission and receiving unit 16 through a lens 1h onto a lens 1i in a fixed position relative to the deflection mirror element 7c. This beam path results in an emission of the radiation bundle at an angle to the optical axis B, which emission is dependent on the positioning of the transmission and receiving unit 16. The radiation received via the objective lens 6' after reflection is guided by a back-reflecting mirror element 7b onto the deflection mirror element 7d and from there to the receiving device 14 integrated in the transmission and receiving unit 16. Since the radiation beam is not emitted through the objective lens 6', image inversion relative to the emission direction results on reception of the radiation which takes place through the objective lens 6'. Suitable positioning of laser diode 8 and receiving device 14 by displacement in the same direction by means of the transmission and receiving unit 16 can thus be achieved.

Figure 13:
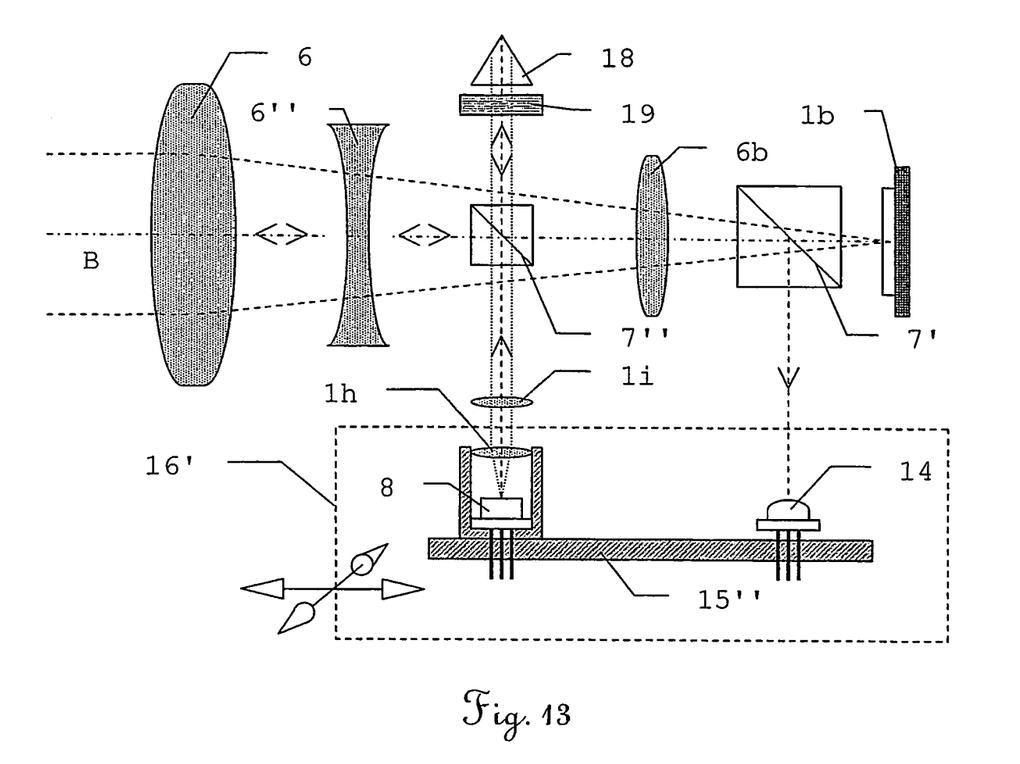

The diagram of a third embodiment of the integration of radiation source and receiving device 14 on a support element 15 is shown in FIG. 13. Here, owing to internal optical focusing of the radiation beam onto the recording device 1b, the necessity of displaying the position of the radiation beam within the acquisition range by an artificially produced point is superfluous. The radiation produced by the laser diode 8 via the lenses 1h and 1i is split by means of a deflection mirror element 7" in the form of a beam splitter into a first and a second part-beam, and the first part-beam is emitted through an objective lens 6 as a radiation beam. The second part-beam is guided via a retroreflector 18, with which a shutter 19 for avoidance of cross-talk can be coordinated, once again onto the deflection mirror element 7" and from there through a lens 6b onto a second deflection mirror element 7' which is in the form of a beam splitter and where a third and fourth part-beam are produced. This deflection mirror element 7' allows the third part-beam of the radiation produced by the laser diode 8 to strike the recording device 1b so that the point of incidence of this radiation corresponds to the position of the radiation beam within the acquisition range. The fourth part-beam is guided onto the receiving device 14. By suitable positioning of the transmission and receiving unit 16', the laser diode 8 and receiving device 14 mounted on a support element 15" can be moved in the same direction and thus aligned.

Of course, the figures presented show one of many embodiments, and the person skilled in the art can derive alternative realization forms, for example with the use of other optical components or sensor units, different beam paths or other alignment means, operating elements and input elements. In particular, the adjustment of radiation source and receiving device can also be effected by other displacement methods not explicitly shown here, for example by rotation or inclinations about a plurality of axes. Equally, the device according to the invention can be applied to similar measuring devices having a different range of functions, such as, for example, total stations or straight forward distance-measuring devices, or to measuring devices having similar but specialized functions, such as, for example, components of military aiming circle or industrial monitoring systems.

The invention claimed is:

1. An electronic display and control device for a geodetic measuring device having a radiation source for emission of a visible or an invisible radiation beam for carrying out a measuring process, the electronic display and control device comprising:

a display that visually displays a measuring range acquired by a recorder, at least one position mark being provided by the display, positioning of the at least one position mark fixing a measuring point for three-dimensional surveying, an input device that inputs data and controls the recorder and the measuring process;

an alignment device that permits variable alignment of an emission direction of the radiation beam relative to an orientation of the recorder, the alignment device and the recorder being designed and arranged so that the radiation beam is coordinated at least partly with at least one optical component of the recorder.

2. The electronic display and control device according to claim 1, wherein the alignment device aligns the radiation beam in the display of the acquired measuring range, so that the position of the radiation beam coincides with the position mark, allowing the radiation beam to be utilized for carrying out the measuring process.

3. The electronic display and control device according to claim 1, wherein the alignment device comprises at least one of:

servo elements for two-dimensional movement of the radiation source, a rotatable and/or tiltable reflecting surface, a deformable reflecting surface, and a transmittive double wedge rotatable relative to one another.

4. The electronic display and control device according to claim 3, wherein the deformable reflecting surface is continuously deformable.

5. The electronic display and control device according to claim 1, further comprising a calibration control device having an image sensor that detects the emission direction of the radiation beam independently of the recorder.

6. The electronic display and control device according to claim 1, wherein the display displays the radiation beam in the measuring range by displaying at least one pixel in a distinguishable manner, the at least one pixel being displayed in a distinguishable manner:

by calculation of the position of the radiation beam in the measuring range and electronic enhancement of the pixel coordinated with this position or by direct optical imaging of the radiation within the recorder.

7. The electronic display and control device according to claim 1, wherein the position mark is positioned by the input device within the display.

8. The electronic display and control device according to claim 7, wherein the position mark is positioned by the input device within the display pixel by pixel.

9. The electronic display and control device according to claim 7, wherein the position mark is positioned by the input device within the display in discrete steps.

10. The electronic display and control device according to claim 1, wherein the positioning of the position mark initiates at least a part of the measuring process.

11. The electronic display and control device according to claim 10, wherein the part of the measuring process initiated comprises at least one of control of the recorder and control of the alignment device.

12. The electronic display and control device according to claim 1, wherein the visual display of the at least a portion of the acquired measuring range is altered by the recorder or display.

13. The electronic display and control device according to claim 12, wherein the portion of the acquired measuring range is altered by variation of assignment of data of pixels of the recorder to pixels of the display.

14. The electronic display and control device according to claim 13, wherein the variation of assignment of data of pixels of the recorder to pixels of the display is electronic.

15. The electronic display and control device according to claim 1, wherein the recorder comprises of at least one of:
a CCD camera,
a CMOS camera,
a video camera,
a low light level amplifier,
a thermal imaging camera,
a spectrally selective detector, and
a spectral filter.

16. The electronic display and control device according to claim 1, wherein the recorder comprises an autofocusing system which is part of the objective or is positioned outside the objective in the beam path.

17. The electronic display and control device according to claim 1, wherein the display comprises at least one of:
a LCD display,
a cathode ray tube,
a flat screen,
an interface to communication networks, and
an electronic computer with a monitor.

18. The electronic display and control device according to claim 17, wherein the electronic computer with monitor is a portable laptop.

19. The electronic display and control device according to claim 1, wherein the input device comprises at least one of:
a touch-sensitive screen,
a touch-sensitive input field,
a keyboard field,
a joystick.
a trackball,
a computer mouse,
an interface to communication networks, and
an electronic computer with input device.

20. The electronic display and control device according to claim 19, wherein the electronic computer with input device is a portable laptop.

21. The electronic display and control device according to claim 1, wherein the display and the input device are combined in one component.

22. The electronic display and control device according to claim 21, wherein the component is a touch-sensitive flat screen.

23. The electronic display and control device according to claim 1, wherein the recorder and the alignment device are in the form of an independent module and are connected to the other components via a wire connection or a radio link.

24. A geodetic measuring device, comprising:
a radiation source for emission of a visible or an invisible radiation beam for carrying out a measuring process,
a receiving device for acquiring radiation of the reflected radiation beam and converting this radiation into signals,
an electronic evaluation device that evaluates the signals, and
the electronic display and control device according to claim 1.

25. The geodetic measuring device according to claim 24, further comprising an orientation device that orients the recorder relative to a measuring range.

26. The geodetic measuring device according to claim 25, further comprising an input device for controlling the orientation device.

27. The geodetic measuring device according to claim 25, wherein the radiation source and the receiving device are arranged on a movable support element.

28. The geodetic measuring device according to claim 25, wherein the radiation source, the receiving device and the alignment device are arranged so that radiation emitted by the radiation source and radiation received by the receiving device are guided via the alignment device.

29. The electronic display and control device according to claim 28, wherein the radiation source, the receiving device, and the alignment device are arranged to form a transmittive double wedge rotatable relative to one another.

30. The geodetic measuring device according to claim 25, wherein the orientation device comprises a device for alignment of the geodetic measuring device relative to a reference point, whereby the recorder moves from the orientation necessary for acquisition of the measuring range into an orientation for detection of the reference point.

31. The electronic display and control device according to claim 30, wherein the reference point is a triangulation point.

32. The electronic display and control device according to claim 30, wherein the device for alignment of the geodetic measuring device is an attachable device.

33. The geodetic measuring device according to claim 24, wherein the positioning of the position mark determines at least one parameter of the measuring process, wherein the at least one parameter is:
fixing of a measuring point for three-dimensional surveying,
control of the recorder,
control of the alignment device or
control of the orientation device.

34. The geodetic measuring device according to claim 24, wherein at least one of the input device and the display are mounted so as to be movable independently of an alignment of the geodetic measuring device.

35. The electronic display and control device according to claim 34, wherein at least one of the input device and the display are mounted so as to be pivotable about a horizontal axis.

36. A module component for a geodetic surveying system, comprising at least one of an integrated input device and/or display device of a geodetic measuring device according to claim 24, and means for establishing a wire connection or a radio link to the geodetic measuring device and optionally to at least one further geodetic measuring device.

37. A geodetic surveying system, comprising at least two geodetic measuring devices according to claim 24 and at least one module component comprising:

at least one of integrated input device display device of the geodetic measuring device, and means for establishing a wire connection or a radio link to the geodetic measuring device and optionally to at least one further geodetic measuring device, wherein the at least one module component is in the form of at least one of common input device and common display for the at least two geodetic measuring devices.

38. The electronic display and control device according to claim 1, wherein the at least one position mark is a crosshair.

* * * * *